Sept. 19, 1944.    G. C. MONACO    2,358,413
STACKING MACHINE
Filed July 7, 1942    2 Sheets-Sheet 1
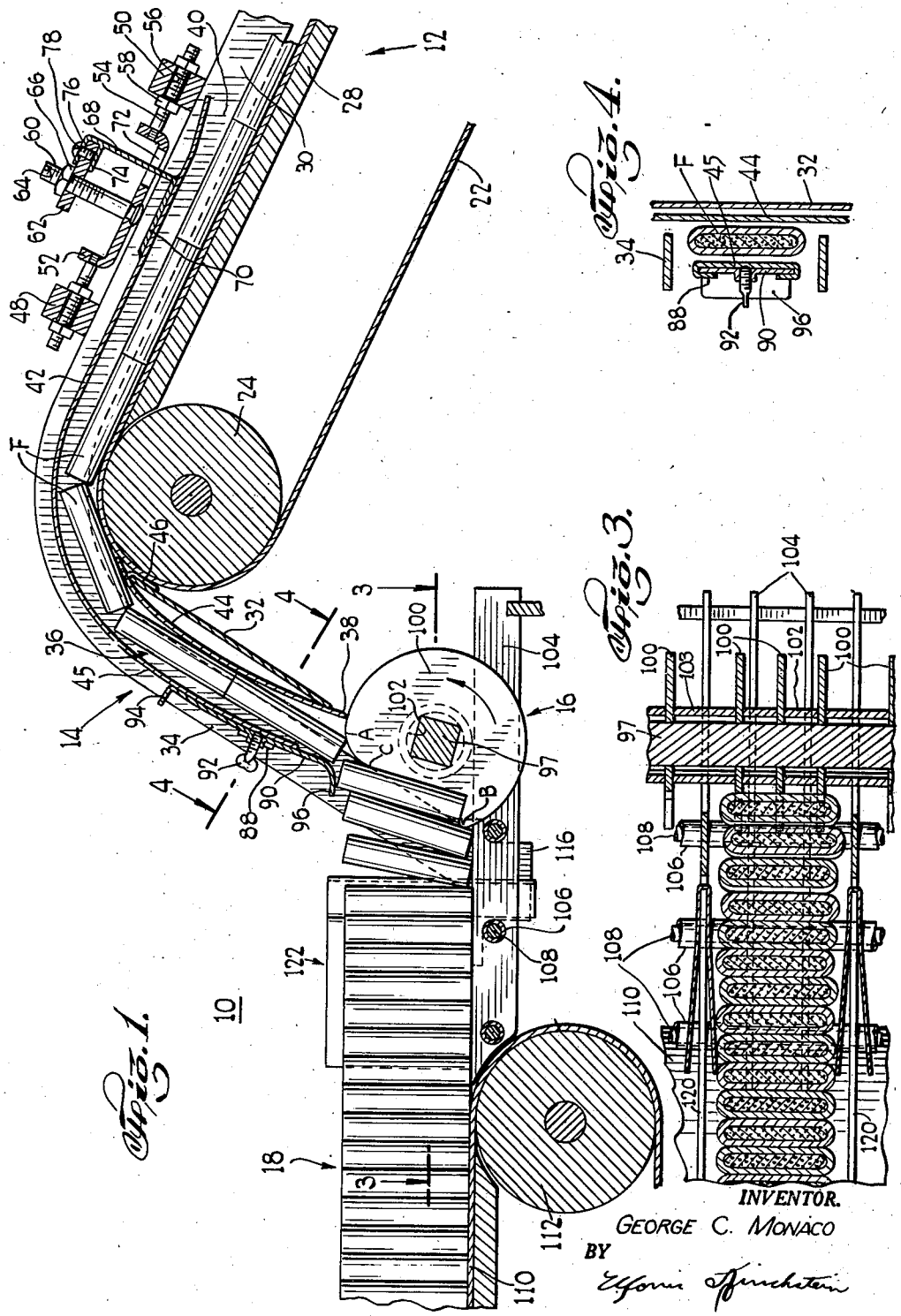
INVENTOR.
GEORGE C. MONACO
BY
ATTORNEY

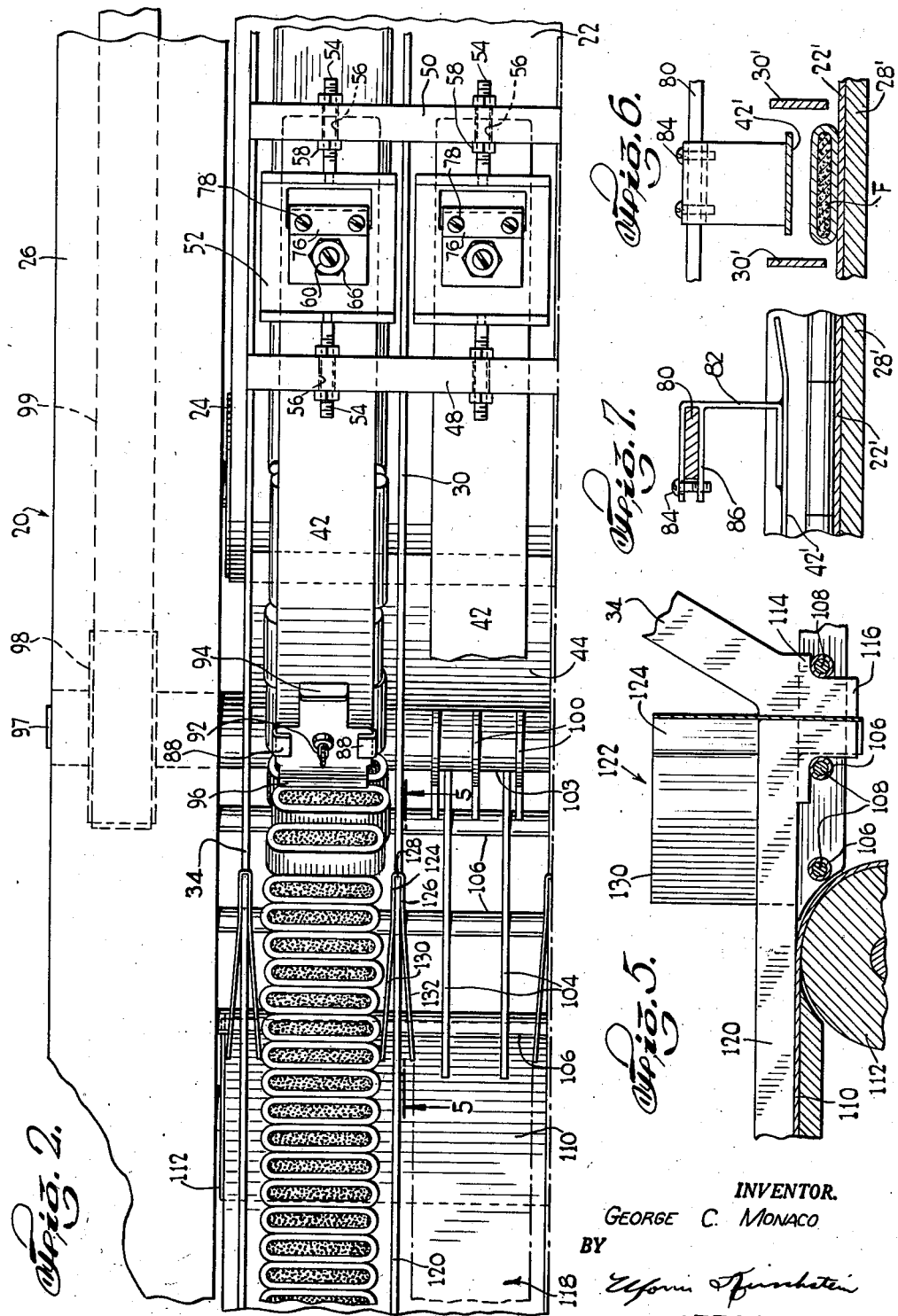

Patented Sept. 19, 1944

2,358,413

UNITED STATES PATENT OFFICE 2,358,413

STACKING MACHINE

George C. Monaco, Douglaston Hills, N. Y.

Application July 7, 1942, Serial No. 450,011

11 Claims. (Cl. 214—7)

This invention relates to stacking machines. More particularly, the invention is concerned with an apparatus for transferring baked objects such as crackers, biscuits, fig bars, and the like from flat to stacked, upright position.

At the present time cookies and like articles are commercially produced on a large scale in continuously operating ovens and coolers having endless conveyors moving therethrough. The cooling conveyor ordinarily carries the cookies on trays and the cookies are therefore transferred in batches to the receiving belt of a stacking machine. The transfer is customarily effected at such a rate that the cookies are spaced from one another on the receiving belt. Due to the interval between trays the spacing between batches of cookies is considerably greater than the spacing between cookies in each batch. The receiving belt gradually elevates the cookies and successively deposits them at the head of a steep trough through which the cookies gravitate to a stacking cam. The rate of rotation of the stacking cam is so adjusted relative to the rate of feed of the receiving belt and the space between cookies thereon that but one cookie is received in each indentation as it passes beneath the trough exit. Nevertheless, even when great care is exercised in controlling the linear speed of the receiving belt, angular speed of the stacking cam, and spacing between cookies on the belt, two or more cookies are often deposited in the same indentation of the stacking cam. The presence of more than one cookie in an indentation leads to one of two troubles: Either the uppermost cookie rides to the top of the vertically stacked cookies where it has to be removed by hand and returned to the receiving belt, or the uppermost cookie wedges between the vertically stacked cookies and a cookie on the steep trough. In the latter case, the stacking cam is bridged and rendered ineffective and the offending cookie must be removed before the stacking cam can resume normal operation.

The stacking cam is intermittently ineffective during the period (between batches) when no cookies are descending the trough. This substantially detracts from the output of the stacking machine.

When fig bars are stacked, an additional problem arises. Fig bars are cookies having fig jam centers enclosed in an open-ended covering of backed sweetened dough. These cookies are formed by extruding the dough around an extruded fig jam center. Due to changes in consistency of the jam and dough, the dough layer varies in thickness. This causes the baked fig bar to vary in width, since where the dough is thicker, leavening of the cookie is greater. To accommodate these various widths, the side guides of the stacking machine are usually spaced apart a distance equal to the width of the widest fig bar. This, however, prevents the side guides from aligning fig bars of a lesser width and such bars arrange themselves irregularly relative to the side guides.

It is an object of my invention to provide an improved stacking machine which overcomes the foregoing difficulties and thereby increases production and lessens the amount of manual help required to operate the machine.

One of the objects of my invention is to provide a stacking machine of the character described in which cookies are fed by the receiving belt to the stacking cam faster than the cookies are transferred to the receiving belt from the conveyor trays, and faster than the stacking cam is able to accommodate the cookies whereby the stacking cam can operate continuously without stopping to wait between batches of cookies from successive trays.

Another object of my invention is to provide a stacking machine of the character described in which cookies after being deposited in spaced relationship on the receiving belt are brought into abutting relationship so that they can be continuously fed into the stacking cam.

A further object of my invention is to provide a cookie stacking machine of the character described in which the cookies are prevented from descending in overlying relationship on to the stacking cam. In this connection, more specific objects of my invention are to guide cookies from the receiving belt to the stacking cam in an enclosed chute which is unable to pass overlying cookies, to gradually curve the chute from the almost horizontal position of the receiving belt to the almost vertical position at which cookies must be fed into the stacking cam, to terminate the chute directly above the stacking cam so that said cam will serve as a control for regulating the rate at which cookies emerge from the chute, to feed but one cookie into each indentation of the stacking cam, to construct the mouth of the chute so that an overlying cookie will be knocked off an entering cookie, and to provide adjustments which will enable the chute to accommodate cookies of various dimensions.

Still another object of my invention is to provide a stacking machine of the character described having a device for aligning the side edges of irregularly arranged vertically stacked fig bars.

Yet another object of my invention is to provide a cookie stacking machine of the character described which shall be simple and economical in construction and rugged and efficient in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which are shown various possible embodiments of this invention, and in which like numbers refer to like parts throughout, Fig. 1 is a vertical fragmentary sectional view through a stacking machine embodying my invention;

Fig. 2 is a fragmentary top plan view thereof;

Fig. 3 and 4 are sectional views taken substantially along the planes indicated by the lines 3—3 and 4—4, respectively of Fig. 1;

Fig. 5 is a sectional view taken substantially along the plane indicated by the line 5—5 in Fig. 2; and Figs. 6 and 7 are fragmentary sectional views of an adjustable cookie chute employed in a modified form of my invention.

Referring now in detail to the drawings and more particularly to Figs. 1 through 5, I have there shown a stacking machine 10 in the process of arranging fig bars F. Said machine comprises a receiving table 12, a series of cookie feeding troughs 14, a series of means 16 for stacking the cookies, and a packing table 18, all supported on a frame 20 (Fig. 2).

The receiving table 12 comprises an inclined endless conveyor belt 22 which travels over an upper roller 24 and a lower roller (not shown). Said rollers are journaled in side pieces 26 of the frame 20, and one of said rollers is driven from a suitable source of power (not shown). The upper portion of the belt is supported by an inclined plate 28 running between the side pieces 26. The conveying surface of the belt is broken up into a plurality of relatively narrow channels across the receiving table 12 by several parallel side strips 30 suitably supported at both ends thereof.

In present day stacking apparatus, after the fig bars F are discharged from the roller 24 at the end of the packing table, they are allowed to gravitate through troughs whose bases comprise a steeply inclined plate 32 running across the machine and whose side walls are formed by angular terminal extensions 34 of the side strips 30.

In accordance with my invention, I transform these steeply inclined troughs into fully enclosed steep chutes 36 having their exit ends 38 almost vertically disposed and their entrance ends 40 substantially parallel to the conveyor belt 22. The entrance end 40 of said chute is defined on three sides by adjacent side strips 30 and a segment of the conveyor belt 22. The fourth side and upper wall of the chute comprises a top strip 42 of self-form maintaining sheet material. Said strip is parallel to and spaced from the portion of the belt 22 which it overlies except at the entrance of the chute 36 where the end of the strip diverges from the belt to provide a flared chute mouth.

The chute discharge end 38 comprises two adjacent terminal strip extensions 34 which define the side walls of this part of the chute. The bottom wall of the discharge end consists of a segment of a curved plate 44 which extends across the machine and is supported on the upper edge of the flat plate 32 by hooks 46. Said curved plate 44 has its upper edge disposed immediately adjacent the belt 22 at about the part where the fig bars begin to slip and fall therefrom. The fourth and upper wall of the discharge end comprises a curved extension 45 of the top 42 which is substantially parallel to the plate 44.

The intermediate portion of the chute is uniformly, smoothly, and continuously curved from the almost horizontal angle at which fig bars are received to the almost vertical angle at which the fig bars are discharged. It will be understood, however, that after the chute has been curved sufficiently to dispose fig bars at the proper discharge angle, the remainder of the chute may be substantially straight. The radius of curvature of said intermediate portion is controlled by the type of products which the machine is designed to handle and is such that articles traveling through the chute travel around the curve in abutting relationship without being permitted to pile up. This is accomplished by having said radius sufficiently large to permit the fig bars to pass around the curve without sticking in the chute while the top and bottom walls 45, 44 of the chute are spaced apart less than twice the thickness of the fig bars.

A feature of my invention is the provision of means for adjusting the spacing between the upper and lower walls of the chute adjacent the entry and discharge ends thereof so that cookies of different thicknesses can be handled. Such means may comprise a pair of parallel spaced bars 48, 50 which span the machine. Between each set of adjacent side strips 30, a shallow U-channel 52 is supported by the bars 48, 50 on the ends of oppositely extending threaded rods 54 which run through untapped holes 56 in said bars. The supporting ends of said rods are non-circular and are snugly received in similarly shaped apertures in the upstanding channel flanges whereby to prevent turning of said channels. Said rods are adjusted by means of nuts 58 which frictionally engage opposite faces of the bars.

A threaded, slot-ended stud 60 is rotatably mounted on each channel 52, and received on each stud 60 is a plate 62 having a tapped aperture. The positions of such plates are varied by turning said studs. Bolts 66 lock the plates 62 in adjusted positions.

Light channels 68 connect the plates 62 and the sheet metal strips 42 which form the tops of the enclosed chutes 36. One lower flange 70 of each light channel 68 is welded to a sheet metal top strip 42, the body of the light channel passes through an aperture 72 in the associated shallow channel 52 whereby to permit adjustment of the strip 42, and adjacent the upper edge of the channel there are provided a pair of parallel flanges 74, 76 which embrace the plate 62 and are secured thereon by screws 78.

When it is desired to move the portion of a top strip 42 adjacent the entrance end 40 of a chute toward or away from the conveyor belt 22, a nut 66 is loosened and the associated stud 60 turned until the strip 42 is properly disposed. The nut is then tightened. To adjust a portion of a strip 42 adjacent the exit end 38 of the chute relative to the curved plate 44, nuts 58 are loosened and a shallow channel 52 shifted until the desired setting is obtained. Said nuts are then tightened. It will be seen that in this manner I am able to separately adjust the strip 42 which closes each chute. This is convenient when two or more sizes or types of cookies are being stacked alongside of one another.

When only one type of cookie is stacked at a time in the machine, I may so arrange the support for the top strips 42 that all of said strips may be simultaneously adjusted. A support of this character is shown in Figs. 6 and 7. In this embodiment of my invention, a non-circular rod 80 runs across the full width of the stacking machine. At its two ends, said rod is adjustably supported on the side pieces 26 by studs, shallow channels and threaded rods (not shown) similar to the studs 60, channels 52 and rods 54 above described. Thus the rod 80 can be moved parallel or perpendicular to the conveyor belt 22. Slidably mounted on the bar 80 are a plurality of light channels 82, each of which has attached to the lower flange thereof a chute top-closing strip 42'. The upper flange of said channel 82 is clamped to the rod 80 by screws 84 cooperating with a plate 86 integral with the channel 82.

The construction just described is particularly useful when the machine is changed to stack cookies of a different width. At such time the side strips 30' are shifted laterally until they are spaced the proper distance apart. With the support for the top strips 42' arranged as shown in Figs. 6 and 7, said strips may also be laterally shifted. Moreover, if the number of chutes is changed I can add or subtract strips 42'.

In accordance with another feature of my invention the top strip 42 is adjustable adjacent the exit 38 of the chute. For this purpose integral inturned flanges 88 are provided along the lower longitudinal edges of said strip. Said flanges are spaced from the strip 42 to form a track for slidably receiving a plate 90. A butterfly nut 92 threadedly mounted on said plate serves to clamp the plate to the top strip 42. The upper end of said plate is provided with an upturned leg 94 to facilitate manipulation of the plate during adjustment. The tip 96 of the plate 90 is flared for a purpose shortly to be described.

The means 16 for vertically stacking fig bars F comprises a non-circular shaft 97 extending across the machine and rotatably journalled in the side pieces 26 where it is driven by a belt 99 and pulley 98. Mounted for rotation with said shaft are a plurality of registered stacking cams 100 having central apertures 102 which match the contour of said shaft. Said stacking cams are maintained in proper relative position by means of spacing collars 103. Several stacking cams are employed in conjunction with each chute 36, the exact number thereof being controlled by the type and width of cookie and varying from two to six or more. The periphery of said cams comprises a portion A—B of constant radius, a portion B—C which is a deep indentation of sufficient size to receive one cookie, and a portion C—A of varying radius. If desired more than one indentation B—C may be employed. Said indentation or indentations should be so proportioned and arranged that after a cookie has been received therein the cookie will block the exit 38 of the chute and, as the cookie is turned away from the exit end by the cam, said end will immediately be blocked by the portion C—A and then by the portion A—B. Subsequent to its reception in an indentation, the cookie is rotated to the desired vertical position. Further rotation of the cam causes the rounded portion C—A to press against the back of the bar and urge it against the previously stacked cookies on the packing table 18.

It will be noted that when a fig bar is first discharged into the indentation A—B the previously stacked bars are held in vertical disposition spaced away from the exit end of the chute so that the last stacked bar can not interfere with the bar being discharged from the chute.

Said packing table includes a grating consisting of a plurality of parallel short flat bars 104 associated with the stacking cams 100. Said bars are maintained in position by a plurality of spacing collars 106 and parallel rods 108 which bridge the machine between the side pieces 26. Enough bars 104 are provided so that one may lie to each side of the stacking cams 100. The bars 104 extend from back of the stacking cams 100 to the upper horizontal portion of a conveyor belt 110 which extends across the machine. Said conveyor belt is supported on a pair of rollers 112, one of which is driven from a suitable source of power (not shown).

It will be noted that the forward end of each angular terminal extension 34 has a projection 114 resting on a sleeve 106 to support the side guide strips 30, and that displacement of said strips laterally of the machine is prevented by legs 116 depending from said extensions and extending between adjacent parallel spacing collars 106.

The receiving table 18 is broken up into a plurality of parallel channels 118 by side guide strips 120 supported at one end on the spacing collars 106, and at the other end on a suitable support (not shown).

It will be appreciated that by supporting the side guide strips 30 and 120 in the manner described, they may be easily adjusted to accommodate cookies of various widths.

In setting up a stacking machine, the side guides 30 and 120 are spaced apart a distance equal to the maximum width of the cookies being handled. However, as has been previously noted, fig bars vary in width and the width of an average fig bar is considerably less than the width of the widest fig bar which will be stacked. This prevents the side guides from registering the edges of the fig bars emerging from the stacking cams. In accordance with my invention, I have provided highly improved means for aligning the side edges of fig bars of diverse width as they leave the stacking cams. Such means comprises a plurality of fittings 122 disposed forwardly of the cams 100, and each including a pair of parallel flats 124 and 126 integrally connected by a narrow base 128. The flats and base are made from resilient material such as sheet steel, and are so dimensioned that the flats are normally spaced apart a distance slightly less than the width of the side guide strips 120. The fittings can thus be clamped on the ends of said strips (Figs. 1, 2, 3 and 5). Extending away from the portion of the forward vertical edges of the flats 124, 126 above the grating are a pair of flaring integral wings 130, 132. The flare and length of these wings is sufficient to reduce the space between adjacent side guide strips 120 from the maximum breadth required to pass the largest possible fig bar to a space slightly less than the width of the smallest fig bar which may have to be stacked. Two adjacent fittings, 130, 132 will thus cooperate to act as a resilient funnel or side-guide for the side edges of the fig bars emerging from the stacking cam.

The machine is adjusted for operation as follows: An operator is told what type of baked article is to be stacked. After ascertaining the maximum width of the article, he arranges the side guide strips 30 and 120 on the receiving table 12 and packing table 18 to accommodate articles of this width. Next, he adjusts the metal top strips 42 relative to the belt 22 and curved plate 44 so that abutting baked articles can pass through the enclosed chutes 36 without sticking or piling up therein. In making this adjustment he must be careful not to permit the metal strips to be spaced away from either the belt or curved plate a distance more than twice the thickness of the articles to be stacked. Lastly, he adjusts the position of the sliding plates 90 at the discharge end of the chute 36. This adjustment is controlled by the dimension of the baked article parallel to its travel through the machine prior to stacking and is such that an article in the stacking cam can be turned to upright position without the top edge of said article being pressed with a mutilating force upon the tip of the metal plate. It will be noted that the ends of the plates are curved so that articles being stacked can angularly emerge from the chutes and so that the top edges of the articles can ride on the curved tips of the plate. The resilience of the plates 90 and of top strips 42 aids in preventing mutilation of the articles.

The operator also adjusts the speeds of the receiving and packing belts 22 and 110 and stacking cams 100. These speeds are correlated with the average rate of transfer of cookies from the cooling conveyor to the receiving table 12. The rotative speed of the stacking cams 100 should be such that said cams will stack articles at the same rate that said articles are delivered, on an average, by the cooling conveyor. This means, of course, that the cams will stack articles slower than their intermittent rate of delivery from the individual cooler trays, and that the cams will catch up during periods of non-delivery. The speed of the receiving belt 22 should be set so that articles are delivered to the stacking cams 100 faster than they can be stacked by said cams. Finally, the speed of the packing belt 110 should be set to take articles away from the stacking cams at the same speed as that at which they are stacked.

When the machine has been adjusted as above described, articles delivered by the cooling conveyor to the belt 22 will be rapidly fed into the discharge chutes 36. Since they are supplied to the chutes faster than they can be stacked by the cams, said articles will be forced into abutment. Due to this rapid feed or overdrive of the belt 22 adjacent articles tend to pile up one on top of another. This is prevented in the chutes by the spacing between the upper and lower walls; and the flared mouths 40 of the chutes 36 prevent overlying articles from entering the chutes. Such articles ride over the entering articles and are subsequently deposited on the belt 22 between batches of articles delivered from the cooling trays. These overlying articles then proceed into the chutes in a normal manner. It will be apparent that the overdriven belt will take up the spaces between batches of articles delivered from successive cooling trays and that there will always be a few articles in each chute.

While the portion A—B of a stacking cam is disposed under the exit end of a chute, delivery of the lowermost article to a stacking cam will be prevented. However, as the stacking cam rotates in a counter-clockwise direction (as viewed from Fig. 1) the short leg of the indentation B—C will be presented beneath the discharge end of the chute to allow partial emergence of the bottom article. As the cam rotates further, and shortly before the longer leg of the indentation is parallel to the discharge end of the chute, the upper end of the article will have substantially cleared the chute and is ready to be stacked. After a few more degrees of rotation the portion A—B of the stacking cam closes the mouth of the chute. As the stacking cam continues to rotate the article is brought into vertical position and is urged by the portion A—C against the previously stacked articles on the packing table 18.

It will thus be seen that I have provided a device and method for using the same in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention, I claim as new and desire to secure by Letters Patent:

1. An article stacking machine of the character described comprising an inclined receiving conveyor belt, a plurality of parallel side guide strips overlying said belt, extending in the direction of travel thereof, and forming with said belt a plurality of side-by-side channels, a curved plate extending away from the upper curved end of said belt, said side guide strips having angular terminal extensions overlying said curved plate, a plurality of top strips intermediate said side guide strips and parallel to and overlying a portion of said belt adjacent the upper end thereof and said curved plate whereby to form a plurality of enclosed side-by-side chutes through which articles are passed, means to simultaneously adjust all of said top strips relative to said belt and said curved plate, and a plurality of registered stacking cams disposed adjacent and over the discharge ends of said chutes, said stacking cams being so constructed and arranged as to regulate the discharge of articles from said chutes.

2. A machine for stacking cookies on edge, said machine comprising an inclined receiving conveyor belt which intermittently receives cookies in spaced relationship, a pair of parallel side guide strips overlying said belt and extending in the direction of travel thereof to form receiving channels in cooperation with said belt, a member extending away from the curved upper end of said belt and sloping downwardly and forwardly to provide a surface down which cookies may gravitate when resting on their bottoms, said guiding strips having angular terminal extensions overlying said sloping member, a top member parallel to and over said sloping member and parallel to and over a portion of said belt adjacent the upper curved end thereof, said top member lying between said side guide strips whereby to form a substantially closed chute which is smoothly and gradually curved between its entrance and discharge portions and through which cookies are adapted to pass edgewise, the spacing between the top and bottom walls of said chute being less than twice the thickness of the cookies being stacked, a stacking cam disposed beneath the exit end of said chute for transferring one cookie at a time from said chute to a receiving surface, means to turn said cam, and means to drive said receiving conveyor belt at such speed relative to the angular speed of the cam that the cookies received on the conveyor in spaced relationship are brought into edge-to-edge abutting relationship in the chute, said cam having a long shallow indentation in its periphery which intermittently, during rotation of the cam, is so disposed as to form an extension of the discharge portion of the chute and receive one cookie only on edge with said cookie edge resting on the short side of the indentation, the top edge of the cookie in the indentation preventing discharge of another cookie from said chute, said cam having a peripheral portion following the indentation which, after said cam has been rotated to disalign said indentation and the exit end of said chute, will block said end while the cookie in said indentation is being transferred by said cam to stacked position on the receiving surface.

3. A cookie stacking machine as set forth in claim 2 wherein adjusting means is provided to move the top member normally to the top run of the belt.

4. A cookie stacking machine as set forth in claim 2 wherein adjusting means is provided to move the top member parallel to the top run of the belt.

5. A cookie stacking machine as set forth in claim 2 wherein adjusting means is provided to selectively move the top member parallel or perpendicular to the top run of the belt.

6. A cookie stacking machine as set forth in claim 2 wherein adjusting means is provided to vary the vertical disposition of the end of the top member over the sloping member.

7. A cookie stacking machine as set forth in claim 2 wherein there are provided several parallel side guide strips and several top members to form several closed chutes which are arranged side-by-side and wherein means is provided to independently adjust the top members relative to the belt and sloping member.

8. A machine for stacking cookies on edge, said machine comprising an inclined receiving conveyor belt which intermittently receives cookies in spaced relationship, a pair of parallel side guide strips overlying said belt and extending in the direction of travel thereof to form receiving channels in cooperation with said belt, a member extending away from the curved upper end of said belt and sloping downwardly and forwardly to provide a surface down which cookies may gravitate when resting on their bottoms, said guiding strips having angular terminal extensions overlying said sloping member, a top member parallel to and over said sloping member and parallel to and over a portion of said belt adjacent the upper curved end thereof, said top member lying between said side guide strips whereby to form a substantially closed chute which is smoothly and gradually curved between its entrance and discharge portions and through which cookies are adapted to pass edgewise, the spacing between the top and bottom walls of said chute being less than twice the thickness of the cookies being stacked, a stacking cam disposed beneath the exit end of said chute for transferring one cookie at a time from said chute to a receiving surface, means to turn said cam, and means to drive said receiving conveyor belt at such speed relative to the angular speed of the cam that the cookies received on the conveyor in spaced relationship are brought into edge-to-edge abutting relationship in the chute, said cam being so constructed and arranged that it will cyclically receive one cookie only at a time from the exit end of said chute, support said cookie on edge directly beneath said exit end whereby the supported cookie prevents discharge of another cookie, and then transfer said supporting cookie on edge to the receiving surface while preventing discharge of another cookie from said chute.

9. A machine for stacking cookies on edge, said machine comprising an inclined receiving conveyor belt which intermittently receives cookies in spaced relationship, a closed discharge chute the bottom wall of whose entrance portion includes the upper curved end of said belt, said chute having a forwardly inclined gravity discharge portion on the surface of which the bottoms of cookies rest while gravitating down the chute, the portion of said chute between the entrance and discharge portions being gradually and smoothly curved and the spacing between the top and bottom walls of said chute being less than twice the thickness of the cookies being stacked, a stacking cam disposed beneath the exit end of said chute for transferring one cookie at a time from said chute to a receiving surface, means to turn said cam, and means to drive said receiving conveyor belt at such speed relative to the angular speed of the cam that the cookies received on the conveyor in spaced relationship are brought into edge-to-edge abutting relationship in the chute, said cam being so constructed and arranged that it will cyclically receive one cookie only at a time from the exit end of said chute, support said cookie on edge directly beneath said exit end whereby the supported cookie prevents discharge of another cookie, and then transfer said supporting cookie on edge to the receiving surface while preventing discharge of another cookie from said chute.

10. A cookie stacking machine as set forth in claim 9 wherein the stacking cam has a long shallow indentation in its periphery which intermittently during rotation of the cam is so disposed as to form an extension of the discharge portion of the chute and receive one cookie only on edge with said cookie edge resting on the short side of the indentation and the bottom of the cookie resting on the long side of the indentation, said cam having a peripheral portion following said indentation which, after said cam has been rotated to disalign said indentation and the exit end of said chute, will block said end after an article has been received in said indentation and is being transferred by said cam to stacked position on the receiving surface.

11. For use in a stacking machine of the character described in which articles whose widths vary are edge stacked, a pair of flat parallel elongated side guide strips terminating adjacent the stacking station, a member underlying said strips, said strips and said member together forming a channel in which stacked articles are received standing on edge, the ends of said strips at said stacking station at the entrance to said channel being aligned, means at said stacking station to push articles into said channel on edge, said means acting on said articles above the edge of which they rest, and a pair of members of resilient sheet material clamped on said ends, said members each comprising two wide parallel flat portions integrally connected to each other and held in spaced relationship by a narrow portion, said flat portions being spaced apart by said narrow portion a distance less than the thickness of a strip and frictionally gripping opposite sides of a strip, each of said portions having an integral wing extending angularly into the channel in the direction of movement of the stacked articles therethrough.

GEORGE C. MONACO.